US008555048B2

(12) United States Patent
Goldstein et al.

(10) Patent No.: US 8,555,048 B2
(45) Date of Patent: Oct. 8, 2013

(54) COMPUTER SYSTEM FOR BOOTING A SYSTEM IMAGE BY ASSOCIATING INCOMPLETE IDENTIFIERS TO COMPLETE IDENTIFIERS VIA QUERYING STORAGE LOCATIONS ACCORDING TO PRIORITY LEVEL WHERE THE QUERYING IS SELF ADJUSTING

(75) Inventors: Martin Goldstein, Campbell, CA (US); Daniel N. Cripe, Round Rock, TX (US); Terry Ping-Chung Lee, Antelope, CA (US); Rajeev Grover, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 12/238,092

(22) Filed: Sep. 25, 2008

(65) Prior Publication Data
US 2009/0287918 A1   Nov. 19, 2009

Related U.S. Application Data

(60) Provisional application No. 61/054,126, filed on May 17, 2008.

(51) Int. Cl.
| G06F 9/00 | (2006.01) |
| G06F 12/14 | (2006.01) |
| G06F 13/00 | (2006.01) |
| G06F 15/173 | (2006.01) |

(52) U.S. Cl.
USPC ............ 713/2; 713/1; 713/200; 711/100; 711/108; 709/238; 709/222

(58) Field of Classification Search
USPC ......... 713/200, 2, 1; 717/168, 174; 709/238, 709/223, 222; 711/100, 108; 1/1; 714/6, 714/36
See application file for complete search history.

(56) References Cited

U.S. PATENT DOCUMENTS

| 3,978,454 | A | 8/1976 | Willard |
| 4,179,172 | A | 12/1979 | Godsey et al. |
| 5,598,318 | A | 1/1997 | Dewitt et al. |
| 5,954,797 | A | 9/1999 | Sidey |
| 6,202,110 | B1 | 3/2001 | Coteus et al. |
| 6,392,142 | B1 | 5/2002 | Uzuka et al. |
| 6,431,890 | B1 | 8/2002 | Li et al. |
| 6,675,295 | B1 | 1/2004 | Marcelais et al. |
| 6,757,177 | B2 | 6/2004 | Harris et al. |
| 6,820,170 | B1 * | 11/2004 | Elnathan et al. ............. 711/108 |
| 6,866,544 | B1 | 3/2005 | Casey et al. |
| 6,892,297 | B1 * | 5/2005 | Aguilar et al. .................. 713/2 |
| 6,973,447 | B1 * | 12/2005 | Aguilar et al. .................... 1/1 |
| 7,743,242 | B2 * | 6/2010 | Oberhaus et al. ............. 713/2 |
| 7,780,455 | B2 | 8/2010 | Leigh et al. |

(Continued)

OTHER PUBLICATIONS

Leigh et al., Final Office Action dated Jan. 27, 2009, U.S. Appl. No. 11/669,860, filed Jan. 31, 2007.

(Continued)

*Primary Examiner* — Thomas Lee
*Assistant Examiner* — Aurel Prifti

(57) ABSTRACT

A computer system has extensible firmware interface firmware. The EFI firmware loads incomplete virtual boot data from a resource manager and then completes the boot data. The completed boot data is used to find an operating-system image to boot. The complete virtual boot data is transferred to the resource manager.

17 Claims, 4 Drawing Sheets

(56) References Cited

U.S. PATENT DOCUMENTS

| | | | |
|---|---|---|---|
| 7,849,300 B2 * | 12/2010 | Hsu et al. | 713/1 |
| 7,861,117 B2 * | 12/2010 | Coronado et al. | 714/36 |
| 2003/0236971 A1 | 12/2003 | Rothman et al. | |
| 2004/0039724 A1 | 2/2004 | Stephan et al. | |
| 2004/0193867 A1 | 9/2004 | Zimmer et al. | |
| 2004/0230963 A1 * | 11/2004 | Rothman et al. | 717/168 |
| 2004/0267926 A1 | 12/2004 | Rothman et al. | |
| 2005/0021847 A1 * | 1/2005 | Rothman et al. | 709/238 |
| 2005/0138408 A1 * | 6/2005 | Vanover et al. | 713/200 |
| 2005/0144609 A1 * | 6/2005 | Rothman et al. | 717/168 |
| 2006/0085628 A1 * | 4/2006 | Brcin et al. | 713/1 |
| 2006/0095753 A1 * | 5/2006 | Hori | 713/1 |
| 2006/0174055 A1 * | 8/2006 | Flynn | 711/100 |
| 2006/0224880 A1 * | 10/2006 | Hara et al. | 713/2 |
| 2006/0236150 A1 * | 10/2006 | Lintz et al. | 714/6 |
| 2007/0150715 A1 | 6/2007 | Rothman et al. | |
| 2008/0091746 A1 | 4/2008 | Hatasaki et al. | |
| 2008/0244055 A1 * | 10/2008 | Anzai et al. | 709/223 |
| 2008/0244561 A1 * | 10/2008 | Teraya | 717/174 |
| 2009/0031014 A1 * | 1/2009 | Chu et al. | 709/222 |
| 2009/0037719 A1 | 2/2009 | Sakthikumar et al. | |
| 2009/0271600 A1 * | 10/2009 | Joshi et al. | 713/2 |
| 2009/0287918 A1 | 11/2009 | Goldstein et al. | |
| 2010/0325406 A1 * | 12/2010 | Ukeda et al. | 713/2 |

OTHER PUBLICATIONS

Leigh et al., Final Office Action dated Jun. 25, 2010, U.S. Appl. No. 11/669,912, filed Jan. 31, 2007.

Leigh et al., Final Office Action dated Dec. 17, 2009, U.S. Appl. No. 11/669,860, filed Jan. 31, 2007.

Leigh et al., Notice of Allowance dated May 3, 2010, U.S. Appl. No. 11/669,860, filed Jan. 31, 2007.

Leigh et al., Office Action dated Jul. 24, 2009, U.S. Appl. No. 11/669,860, filed Jan. 31, 2007.

Leigh et al., Office Action dated Aug. 5, 2008, U.S. Appl. No. 11/669,860, filed Jan. 31, 2007.

Leigh et al., Office Action dated Dec. 28, 2009, U.S. Appl. No. 11/669,912, filed Jan. 31, 2007.

Leigh et al., Response to Office Action dated Dec. 28, 2009, filed Jan. 29, 2010, U.S. Appl. No. 11/669,912, filed Jan. 31, 2007.

Leigh et al., Response to Restriction Requirement dated Sep. 3, 2009, filed Sep. 21, 2009, U.S. Appl. No. 11/669,912, filed Jan. 31, 2007.

Leigh et al., Restriction Requirement dated Sep. 3, 2009, U.S. Appl. No. 11/669,912, filed Jan. 31, 2007.

* cited by examiner

COMPUTER SYSTEM FOR BOOTING A SYSTEM IMAGE BY ASSOCIATING INCOMPLETE IDENTIFIERS TO COMPLETE IDENTIFIERS VIA QUERYING STORAGE LOCATIONS ACCORDING TO PRIORITY LEVEL WHERE THE QUERYING IS SELF ADJUSTING

This patent application claims the benefit of U.S. Provisional Patent Application 61/054,126, filed May 17, 2008.

BACKGROUND OF THE INVENTION

When powered on, most computers refer to firmware to determine the location of a binary image of an operating system (OS) and/or hypervisor/virtual machine host software to be booted. Where there is more than one possible location of the OS image, the firmware can provide a prioritized list of locations. The highest-priority location is checked first; if an OS image is found there, the operating system is booted from that image. If no suitable OS image is found at a listed location, the next location in the list is checked.

Some data centers and other large computer systems use a storage area network to connect many computers to many storage devices. So that each computer does not have to search through all available storage devices for an OS image, each computer and each disk storage unit can be configured to interact with only one or a limited number of devices. For example, each computer and each storage device comes with factory-set hardware identifiers. Each computer can be configured to interact only with storage devices having certain hardware identifiers, and each storage device can be configured to only interact with computers having certain hardware identifiers, e.g., unique world-wide names (WWNs). However, in very large computer systems, this configuration task can be unwieldy; typically, an administrator or administrative team must keep track of all the configurations to ensure everything works as intended and conflicts are avoided.

Virtual Connect technology, available from Hewlett-Packard Company, substantially eases the burden of managing storing resources for computer systems. Using this technology, storage devices can be pre-configured to work with computers with certain identifiers. To allow a computer to access a storage device, the computer can be configured with the corresponding virtual identifier. If, for example, a computer fails, its virtual identifier can be migrated to its replacement, obviating the need to reconfigure the storage device each time the computer it is assigned to is changed.

Whether a computer is configured directly or by importing data from its slot, the configuration data must identify the location of an OS image. For some BIOS (basic input-output system) firmware, the information needed is fairly limited and is generally well understood by system administrators. For example, the configuration data for storage devices, such as Fibre Channel or SAS (Serial-Attached SCSI), may need to specify a source WWN (e.g., for a host-bus adapter installed on a computer), a WWN for a disk array, and a LUN (logical unit number that identifies a section of a disk array assigned to a given computer). However, computers using more advanced and flexible EFI (extensible firmware interface) require more information, such a boot directory, boot file name, disk partition, and some EFI-specific variables. OS installers typically handle such information so that, generally, system administrators do not have ready access to this data. Thus, making Virtual Connect technology available to EFI-based computers has posed a challenge.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides for automatic completion of boot data that is incomplete in the sense that it does not provide all the information required by EFI firmware to locate an OS image. Herein, "EFI" refers not only to the Extensible Firmware Interface, but derivations thereof including the Unified Extensible Firmware Interface "UEFI".

Thus, an administrator can specify source and target WWNs and a LUN; while this information would be considered complete in a BIOS environment, it is not sufficient in an EFI environment. When the EFI firmware imports incomplete virtual boot data from a Virtual Connect (VC) module or other external or internal resource manager (RM), the EFI firmware completes the virtual boot data. So that the data in the resource manager and in the EFI firmware are coherent, the EFI firmware provides a copy of the completed virtual boot data to the resource manager. Accordingly, virtual boot data is transferred in both directions between the resource manager and the EFI firmware.

Once the resource manager has complete virtual boot data, the latter can be transferred to another computer (either in a different location or a replacement computer in the same location) for use by that computer's EFI firmware. Where the resource manager is a Virtual Connect module, the virtues of Virtual Connect technology are extended from a BIOS-only implementation to one that handles EFI-based computers as well.

Figure 1:
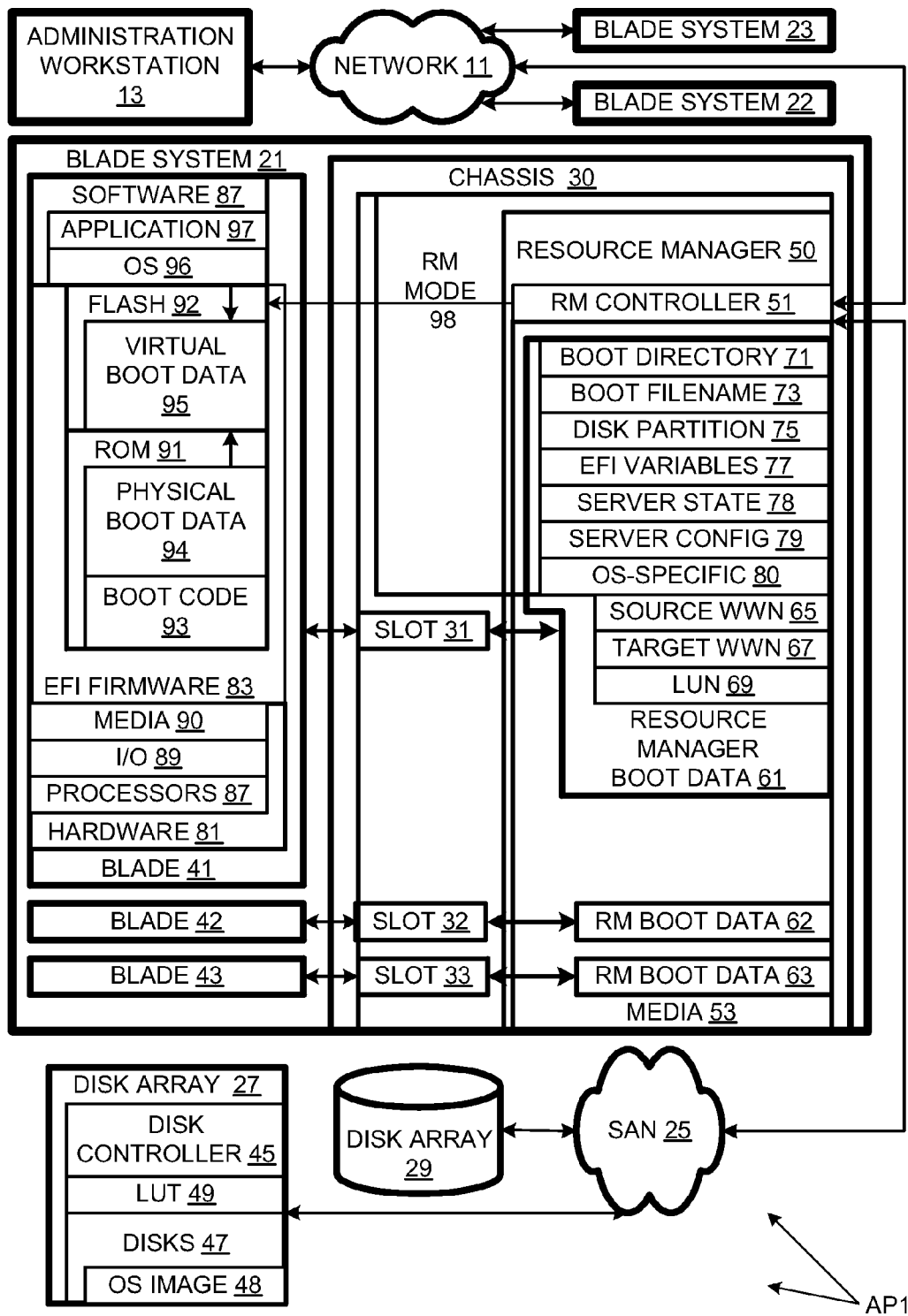
FIG. 1 is a schematic diagram of a computer system in accordance with an embodiment of the invention.

A computer system API, shown in FIG. 1, comprises a computer network 11 connecting an administration workstation 13, and blade systems 21, 22, and 23. In addition, computer system API includes a storage-area network (SAN) 25 connecting blade systems 21, 22, and 23 to disk arrays 27 and 29. Each blade system provides a chassis with slots to which computer blades (modular computer components) can be installed. For example, blade system 21 includes a chassis 30 with slots 31, 32, and 33, into which blades 41, 42, and 43 are respectively installed. More generally, the invention provides for computer systems with stand alone and alternative types of modular computer systems. The invention provides for modular computer systems that provide for different numbers of modules as well.

While the invention is described in the context of blade systems, it also can be practiced in the context of rack mount and other computer systems. For example, a rack of computers can also include a rackmount resource manager module with multiple ports. Each port can be connected, e.g., using a respective cable, to a respective computer. In this case, the port serves the function of the blade slots. The resource-manager boot data is associated with the port, rather than the computer attached to the port. When the computer is swapped, the resource-manager boot data is available to the replacement computer.

In system API, storage arrays 27 and 29 are connected to blade system 21 via SAN 25. In other embodiments, external disk arrays can be connected directly to a computer. The disk arrays are assigned a real (factory assigned) world-wide numbers. Each disk array includes a controller, storage disks, and a LUN table that assigns logical unit numbers LUNs to logical divisions or "units" of the disk array. Each lookup table assigns to each logical unit number a computer identifier, indicating which host WWN (is allowed to access) the corresponding logical unit of the storage array. For example, disk array 27 includes a disk controller 45, disks 47 on which an OS image 48 can be stored, and a look-up table (LUT) 49.

Chassis 30 includes a resource manager 50 with a resource controller 51 and computer-readable media 53. Media 53 is used for storing resource-manager boot data 61, 62, 63 for respective slots 31, 32, and 33. Each slot's resource-manager data can include values or strings for "user-visible" parameters host WWN, storage-device WWN, and LUN. In addition, each slot's resource-manager data can include a virtual set of EFI variables that are generally hidden from the user.

When a blade is in resource-manager SAN mode, system firmware matches the user visible WWN/WWN/LUN information with the larger (complete) set of EFI boot records found in the physical set of EFI boot records found in the EFI variables and raises the priority of any record that matches the user-visible SAN boot information. As a result, the physical set of EFI variables (stored as part of the EFI firmware) is ignored (hidden) and is replaced with the virtual EFI variable values. For example, resource-manager boot data 61 for slot 31 is shown specifying "user-visible" data such as source WWN 65, target WWN 67, LUN 69. In addition, virtual boot data 61 can also specify "user-hidden" data such as boot directory 71, boot filename 73, disk partition 75, and EFI variables 77, server state 78, server configuration 79, and OS-specific information, which can be used by EFI firmware 83 and, in some cases, updated by EFI firmware 83 and an operating system.

Each blade 41-43 includes hardware, firmware, and, at least when in use, software. For example, blade 41 includes hardware 81, EFI firmware 83, and software 85. Hardware 81 includes data processors 87, communication devices 89 including I/O (input/output) devices, and computer-readable storage media 90, including local disk and solid-state storage devices. The solid-state storage devices include volatile RAM (random-access memory), non-volatile ROM (read-only memory) 91, and non-volatile read-mostly memory, e.g., flash 92.

Firmware consists of computer programs and data that are embedded in hardware. The programs are typically stored in non-volatile solid-state memory. EFI firmware 83 includes boot code 93 stored in ROM 91, default boot data 94 stored in ROM 91, and virtual boot data 95 stored in flash memory 93. In an alternative embodiment, the boot code, the default boot data, and the virtual boot data are all stored in flash memory so that the firmware can be readily updated. However, during normal operation, the boot code and the default boot data are not modified, while the virtual boot data may be.

Software 87 includes an operating system 96 and an application 97 that defines a mission for blade 41. Software 87 can be stored on local or external disks and transferred to RAM as needed for execution. Software stored on external disks can be transferred to a replacement blade or a blade in another slot or location, e.g., in the event the original blade fails.

Figure 2:
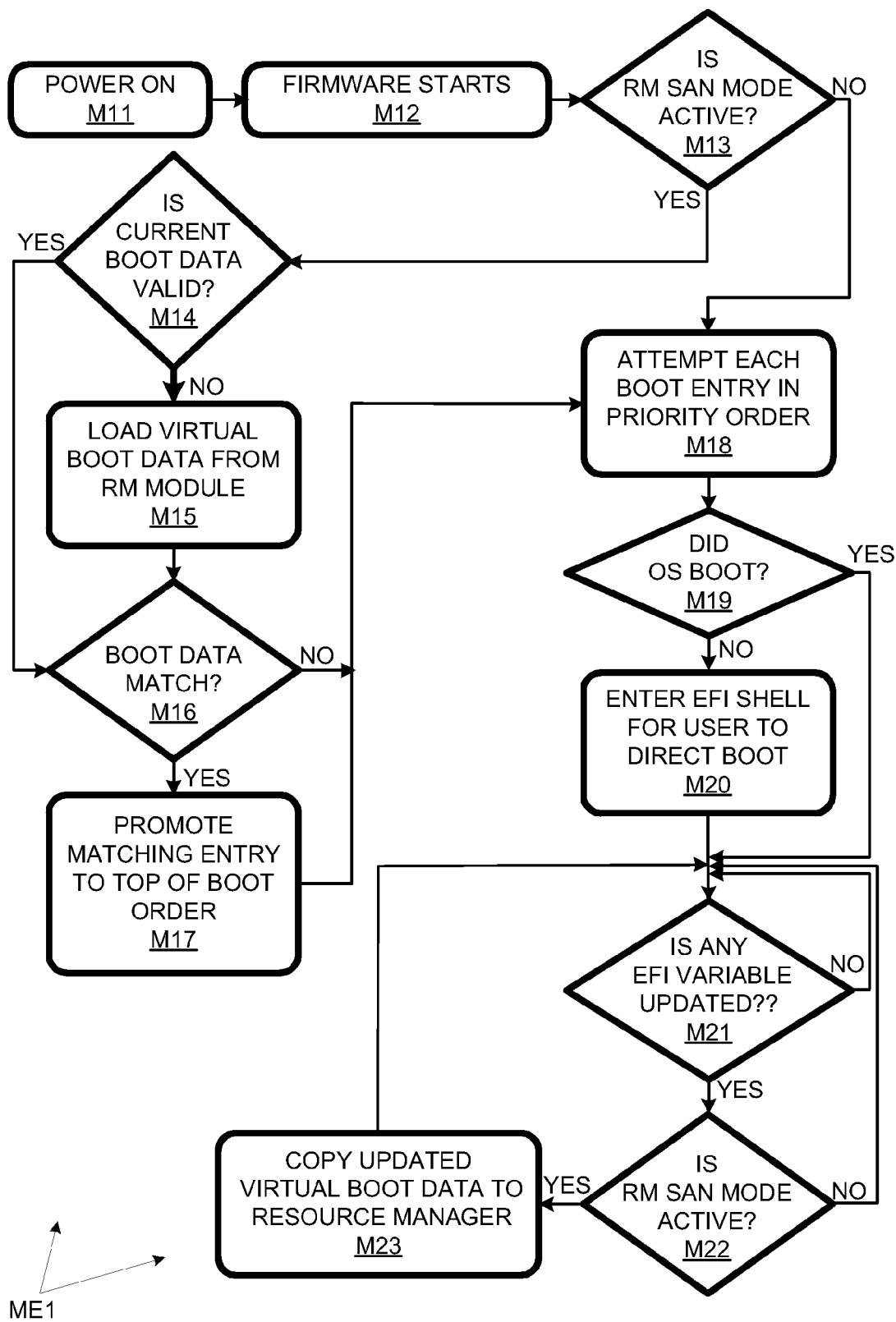
FIG. 2 is a flow chart of a first method in accordance with an embodiment of the invention.

The present invention provides for a method ME1 as flow charted in FIG. 2. At method segment M1, power to a blade is turned on or the blade is reset. At method segment M2, the EFI firmware starts execution. At method segment M13, the EFI firmware checks to see if the resource-manager SAN mode (aka, "RM mode") is active so that the blade may boot from an image on a storage area network.

The "physical" set of EFI variables are essentially ignored (hidden) when in RM mode and "replaced" with the VC stored "virtual" set of EFI variables. System firmware matches the customer visible WWN/WWN/LUN information with the larger (complete) set of EFI boot records found in the EFI variables, and raises the priority of any record that matches the "customer visible" SAN boot information.

In other words, if resource-manager mode is active, the EFI checks to determine if the current virtual boot data is valid, at method segment M14. In this case, "valid" means the resource-manager data on the blade is known to be the same as the resource-manager boot data stored by the resource manager. For example, the EFI firmware can query the resource manager to determine if its resource-manager boot data has been changed since the last time the virtual boot data on the blade and the resource-manager boot data on the resource-manager hardware were reconciled. If at method segment M14, it is determined that there is no virtual boot data or that the boot data present is not valid, virtual boot data is loaded from the resource-manager hardware to the blade at method segment M15. If at method segment M14, it is determined that the virtual boot data is valid, method segment M15 can be skipped.

In either case, virtual boot data is compared with the physical boot entries at method segment M16. Prior to this comparison, these entries are assigned priority rankings. If one of these entries matches the virtual boot data, it is promoted to top priority, in effect completing the incomplete virtual boot data at method segment M17. If two or more of these entries match the virtual boot data, they are collectively promoted to top priority over any non-matching entries; among themselves, they retain their previous relative ranking. For example, the resource-manager boot data may specify a particular LUN; there may be plural OS images at this location—each corresponding to a different physical boot entry. All the entries pointing to OS images specified by the physical boot data are promoted over non-matching boot entries. Whichever of the promoted entries had (before the promotion) the highest priority among the promoted entries becomes the top-priority boot entry.

At method segment M18, the EFI firmware attempts to boot from each entry in priority order. If at method segment M13, the EFI firmware determined that resource-manager boot mode was not active, the boot order is the original physical boot order. If, at method segment M16, no match was found, the boot order is the original physical boot order. Otherwise, the boot order is the revised boot order from method segment M17. At method segment M19, the EFI firmware determines whether or not the blade was successfully booted. If all entries have been tried and the blade has not booted, the EFI firmware enters an EFI shell (user interface) and waits for a user to manually direct the OS boot.

Once an operating system is booted, it can modify the virtual boot data by making calls to the EFI firmware. At method segment M21, the EFI firmware determines whether an EFI variable has been updated. If it has not, method ME1 loops back to method segment M21 to monitor for further changes. If an EFI variable has changed, the RM mode is checked at method segment M22. If it is inactive, method ME1 returns to method segment M21 and continues monitoring for changes to EFI variables. If at method segment M22, it is determined that RM mode is active, the updated virtual boot data is copied to the resource manager. At this point, method ME1 returns to method segment M21 to monitor for further changes to EFI variables.

Figure 3:
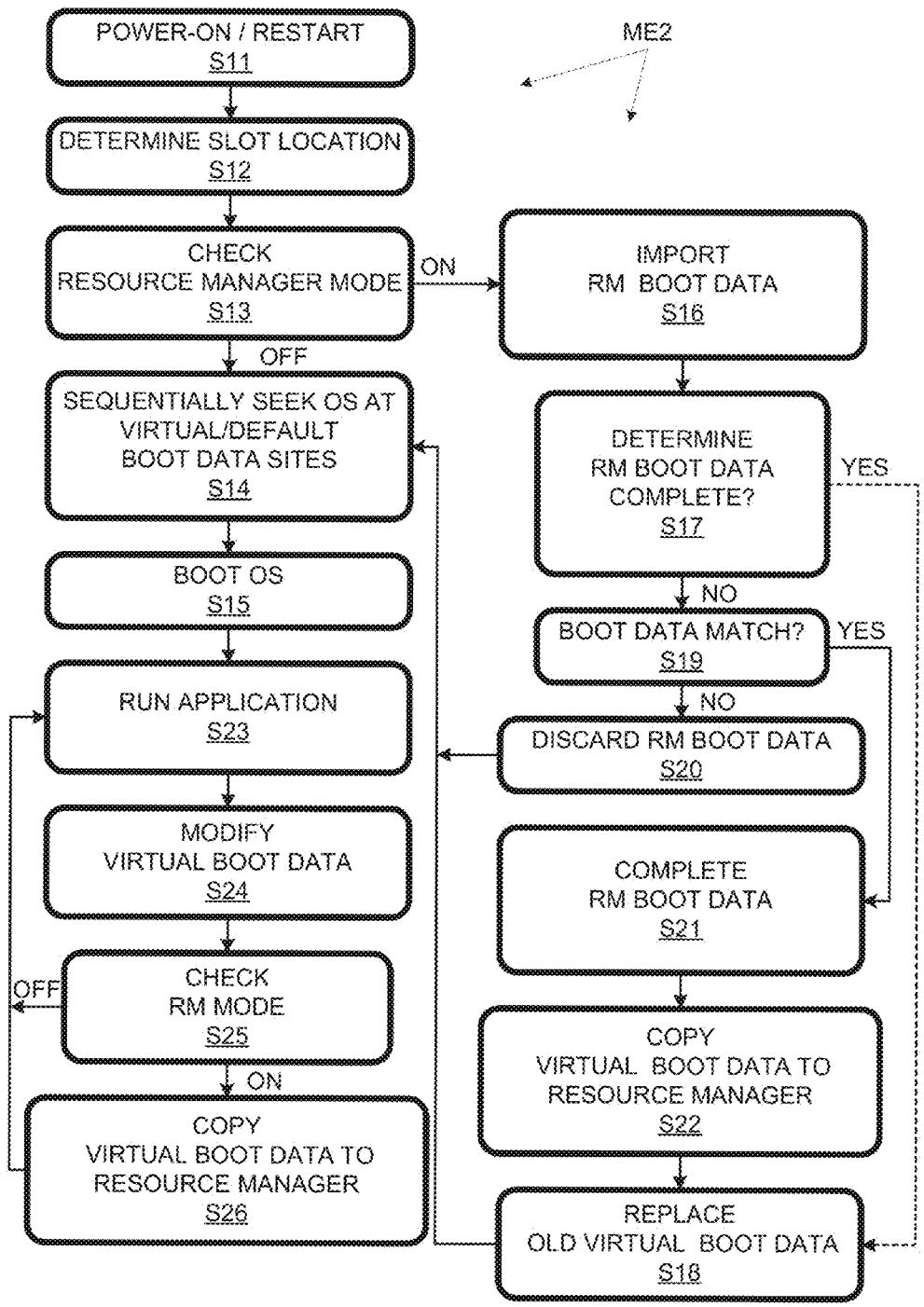
FIG. 3 is a flow chart of a second method in accordance with an embodiment of the invention from the perspective of a blade system.

The present invention also provides for a method ME2, which can be considered from 1) the perspective of a blade, 2) the perspective of a resource-manager module, and 3) the perspective of an administrative workstation. FIG. 3 represents the blade perspective, and blade 41 is used as an example. From the blade perspective, method ME2 begins at method segment S11 with a power-on or restart of blade 41. At method segment S12, EFI firmware 83 determines its slot location, e.g., blade 41 is installed in slot 31 of chassis 30. At method segment S13, EFI firmware 83 checks for a resource-manager mode 98.

RM mode can be "ON" or "OFF". For RM mode to be "ON" from the perspective of a blade, a resource-manager module must be installed in the chassis and the module must be asserting the ON mode. If no module is installed or if VC mode 98 for an installed module is OFF, EFI firmware 83, will detect that the RM mode is OFF.

If, at method segment S13, it detects that the resource-manager mode for its slot is OFF, EFI firmware 83 searches for an OS image in locations indicated by the default boot data and the current virtual boot data at method segment S14. When the boot data indicates more than one possible location; the boot data prioritizes the possible locations to determine the order in which they are to be checked. If no OS image is found in the highest priority location, EFI firmware 83 looks in the second priority location, and so on. Whenever in this sequential search a boot image is found, EFI firmware 83 boots to the operating system represented by that image at method segment S15.

If at method segment S13, it detects that the resource-manager mode 98 for its slot is ON, EFI firmware 83 imports resource-manager boot data from the resource manager at method segment S16. At method segment S17, EFI firmware 83 determines whether or not the imported boot data is "complete" or whether some parameter values are left unspecified. If the imported boot data is complete, it replaces the pre-existing virtual boot data at method segment S18; in other words, the complete resource-manager boot data becomes the new virtual boot data. In this case, method ME1 branches to method segment S14, to search for an OS image, beginning at the location indicated by the new virtual boot data.

If, at method segment S17, it is determined that the resource-manager boot data is "incomplete" (not all parameter values are specified), an attempt is made at S19 to match what resource-manager boot data there is with the existing virtual or default boot data. (If there is no resource-manager boot data, there is no match.) For example, the resource-manager boot data may specify a source WWN, a target WWN for a storage array, and a LUN, but not values for other EFI boot parameters. In this case, locations indicated by the pre-existing virtual boot data and the default boot data are checked for matching source WWN, target WWN, and LUN values. If no match is found, EFI firmware 83 discards its copy of the resource-manager boot data at method segment S20. Then method ME1 branches to method segment S14 to seek a boot image using the pre-existing virtual boot data and the default boot data.

If at method segment S19, a match is found, the matching data is used to "fill-in" the resource-manager boot data at method segment S21. In other words, for parameters for which the resource-manager boot data does not provide values or strings, the values or strings for the matching data is used. For example, if the resource-manager boot data does not provide a boot filename, the boot filename for the matching location is used. The new virtual boot data is copied, at method segment S22, to resource-manager hardware 50, where it overwrites (or completes) the resource-manager boot data. The completed boot data becomes the new virtual boot data at method segment S18. From method segment S18, method ME1 jumps to method segment S14 to seek an OS image.

Once operating system 96 is booted at method segment S15, application 97 can be launched and run at method segment S23. The operating system, or an application or utility can modify virtual boot data at method segment S24. EFI firmware 83 then checks resource-manager mode 98 at method segment S26. If it is OFF, method ME1 continues running the application at method segment S23. If it is ON, EFI firmware 83 copies, at method segment S26, the modified virtual boot data to resource-manager hardware 50, where the data becomes the new resource-manager boot data. Then method ME1 returns to running application 97 at method segment S23.

Figure 4:
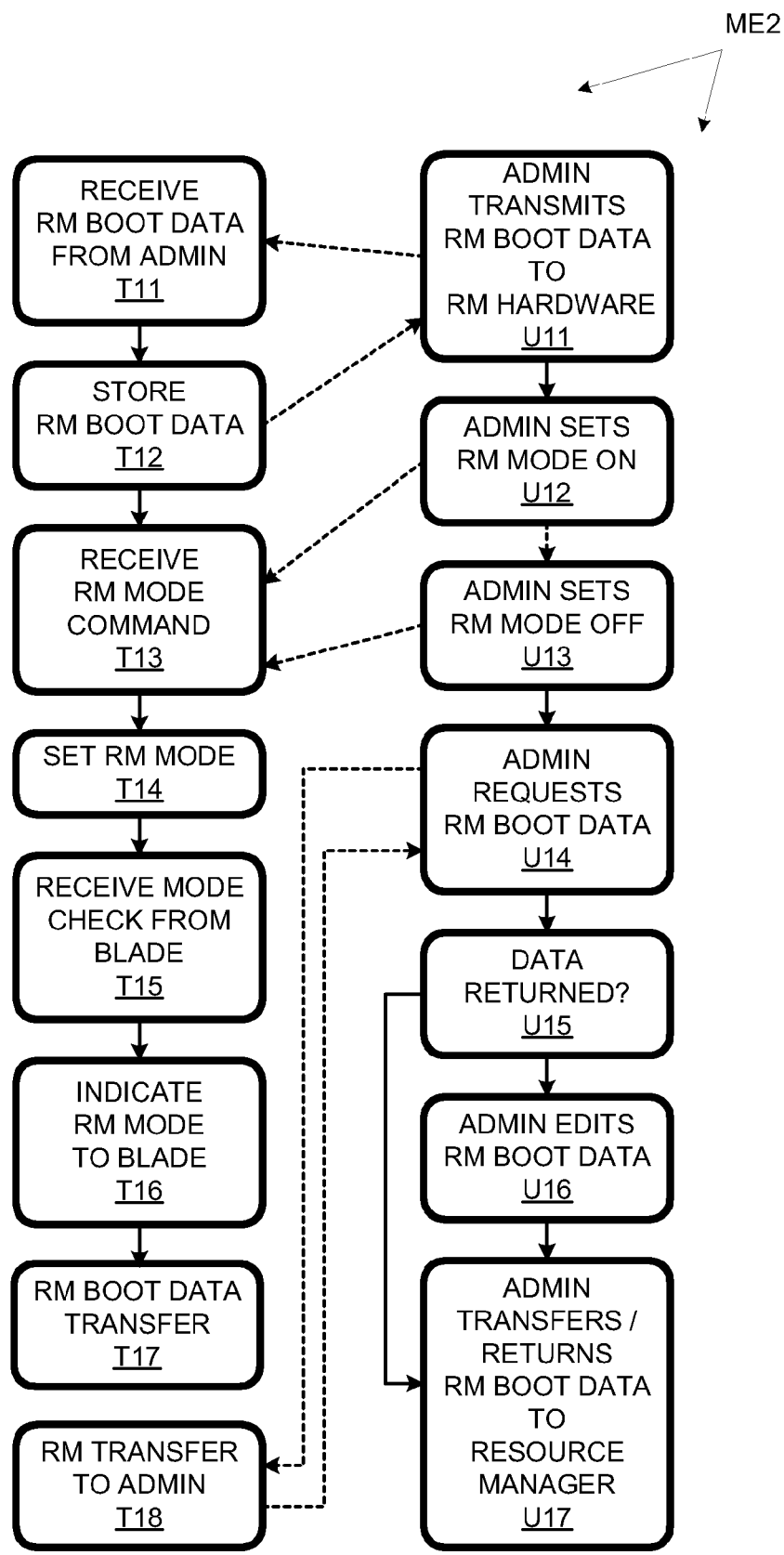
FIG. 4 presents related pair of flow charts of the method of FIG. 3 from the respective perspectives of resource manager and an administration workstation.

Method ME2 is represented from the perspective of f-resource manager 50 in FIG. 4. At method segment T11, resource manager 50 receives RM boot data from administrative workstation 13. At method segment T12, the incoming data is stored as virtual boot data 95.

At method segment T13, resource manager 50 receives a mode command from administrative workstation 13 indicating whether resource-manager mode is to be set ON or OFF. Resource manager 50 sets its VC mode accordingly at method segment T14. Changing VC mode 98 does not affect any concurrent transaction with a blade, but determines whether a subsequent transaction can begin or not.

At method segment T15, resource manager 50 receives a VC mode request from a blade (e.g., via method segment S13). At method segment T16, hardware resource manager 50 indicates its VC mode to the blade. At method segment T17, resource manager 50 engages in a transfer of VC boot data, typically a read (e.g., via method segment S16) from and then a write (e.g., via method segment S23) to resource manager 50 by the blade. In response to a request from administration workstation 13, resource manager 50 can transfer complete boot data to workstation 13. Note that many of steps T11-T18 can occur independently of each other, so many variations on the illustrated order are possible.

Method ME1 is also flow charted from an administrative perspective in FIG. 4. At method segment U11, an administrator (via administration workstation 13) sends virtual boot data to VC hardware 50. Note that this corresponds to method segment T11. At method segment U12, administration workstation 13 can command that VC mode 98 be set to ON so that the corresponding blade can read the resource-manager boot data.

However, since administration workstation 13 does not know whether or not this data has been modified in the interim, it must read from resource manager 50 whenever it needs to determine the current values for resource-manager boot data, e.g., data 61-63. To obtain the current VC boot data, administration workstation 13 commands resource manager 50 to set VC mode 98 to OFF at method segment U13 (so that it is not modified during the read operation). At method segment U14, administration workstation 13 requests the current VC boot data. At U15, administration workstation 13 receives the requested boot data or a refusal.

Once workstation 13 has the current data, it may edit it at method segment U16. The boot data (edited or unedited) can be transferred to resource manager 50 at method segment U17 (e.g., by returning to method segments U11-U13). In this way, administration workstation 13 can 1) return the boot data for use by the same blade that used it before; 2) return the boot data for use by a replacement blade installed in the same slot as the blade that owned the boot data before; 3) transfer the boot data to a new location (either in the same chassis or in a different chassis) for use by a new blade; or 4) transfer the boot data to a new location for use by the old blade. The latter could occur where a working blade is moved from a defective chassis (e.g., one in which the fans are failing) to a new chassis.

As many method segments are independent of each other, method ME1 can be varied by reordering some method segments. Method ME1 can be modified according to the capabilities of the system involved. For example, which components play what roles transferring boot data can differ according to the communications protocol involved. As noted above, the invention can apply to rackmount and other modular and non-modular computer systems. In this case, the resource manager can be a rackmount device having ports that connect via cables to rackmount computers; the ports then serve as "slots" with which rackmount computer modules can be engaged and disengaged.

While the present invention has been described above in the context of Hewlett-Packard's resource-manager technology, it can also apply in the context of other resource manager technologies that allow EFI boot data to be assigned and migrated. Thus, the invention provides for other resource manager technologies that use specialized hardware external to a computer to hold a copy of the virtual boot data used by a connected computer. In other embodiments, the resource manager can be internal to the computers and EFI boot data can be migrated using a network directly connecting computers. Herein, a resource manager is "external" if it is external or if the computer it serves can be readily replaced without opening the computer. These and other variations upon and modifications to the illustrated embodiments are provided by the present invention, the scope of which is defined by the following claims.

What is claimed is:

1. A computer system comprising non-transitory media encoded with:
   physical boot data including a prioritized list of storage-location entries including a higher-ranking storage-location entry and a lower-ranking storage-location entry having a lower ranking than said higher-ranking storage-location entry, each of said storage-location entries identifying a respective storage location to be searched for an operating-system image; and
   EFI firmware configured to, when executed by a processor, in response to receipt of incomplete virtual boot data from a resource manager,
      if said incomplete virtual boot data does not match said higher-ranking storage-location entry and does not match said lower-ranking storage-location entry, searching a storage location identified by said higher-ranking storage location entry before searching a storage location identified by said lower-ranking storage-location entry for said operating-system image,
      if said incomplete virtual boot data does not match said higher ranking storage-location entry and does match said lower ranking storage-location entry, searching a storage location identified by said lower-ranking storage-location entry before searching a storage location identified by said higher-ranking storage-location entry for said operating-system image;
   said EFI firmware being further configured to send complete virtual boot data to said resource manager, said complete virtual boot data corresponding to a matching storage-location entry;
   said incomplete virtual boot data specifying source and target world-wide names and a logical unit number but not a file name; and
   said complete virtual boot data specifying said source and target world-wide names, a logical unit number, and a file name used by said EFI firmware to locate an operating-system image.

2. A computer system as recited in claim 1 wherein said EFI firmware detects when an operating system updates said virtual boot data, and uploads the updated virtual boot data to said resource manager.

3. A computer system as recited in claim 1 wherein said EFI firmware is further configured to, in the event that said incomplete virtual boot data does not match said higher ranking storage-location entry and does match said lower ranking storage-location entry, promote said lower-ranking storage-location entry to a highest ranking in said list.

4. A computer system as recited in claim 3 wherein, in the event said searching returns multiple matches, said EFI firmware retains the original relative rankings of matching boot entries while promoting them collectively to highest rankings in said list.

5. A computer system as recited in claim 1 wherein said EFI firmware resides in a computer and said resource manager is external to said computer, said resource manager including computer-readable media for storing said incomplete virtual boot data and said complete virtual boot data.

6. A computer system as recited in claim 5 wherein said media concurrently stores virtual boot data for multiple computers, each having EFI firmware.

7. A computer system as recited in claim 5 wherein said computer connects to a storage area network through said resource manager.

8. A computer system as recited in claim 5 wherein said resource manager includes a controller for receiving incomplete virtual boot data from an administrative workstation.

9. A computer system as recited in claim 1 wherein said EFI firmware is UEFI firmware.

10. A method comprising:
   transferring incomplete virtual boot data from a resource manager to EFI firmware of a computer;
   completing said incomplete virtual boot data to yield complete virtual boot data corresponding to a matching entry in a prioritized list of storage-location entries identifying respective storage locations to be searched for an operating-system boot image, said matching entry having a lower ranking in said prioritized list than a non-matching entry;
   using said complete virtual boot data to locate and boot to an operating system before searching a storage location identified by said matching entry before searching a storage location identified by said non-matching entry for said operating-system boot image; and
   transferring said complete virtual boot data from said EFI firmware to said resource manager;
   wherein, said incomplete virtual boot data specifies source and target world-wide names and a logical unit number but not a file name; and said complete virtual boot data specifies said source and target world-wide names, a logical unit number, and a file name used by said EFI firmware to locate an operating-system boot image.

11. A method as recited in claim 10 wherein said completing involves searching for a match between said incomplete virtual boot data and a physical boot data entry for said EFI firmware in said list and promoting any matching physical boot entry relative to any non-matching physical boot data entry.

12. A method as recited in claim 10 further comprising:
transferring said incomplete virtual boot data from an administration station to said resource manager; and
transferring said complete virtual boot data from said resource manager to said administration station.

13. A method as recited in claim 12 further comprising transferring said complete virtual boot data from said administration station to a second computer different from said first computer via a resource manager associated with said second computer.

14. A method as recited in claim 12 wherein said resource manager includes a first port to which said first computer is connected and a second port to which said second computer is connected.

15. A resource manager comprising:
physical connectors for connecting to respective computers;
non-transitory computer-readable media for storing virtual boot data for each of said physical connectors for use by said computers in locating an operating-system image to boot from; and
a controller for transferring incomplete virtual boot data stored in said media to one of said computers via a respective one of said physical connectors and for transferring complete boot data specifying a location to be searched for an operating-system image from that computer to said media, said controller being connected to a disk array via a storage array network, said disk array including a target location of said complete boot data; wherein
said incomplete virtual boot data specifies source and target world-wide names and a logical unit number but not a file name; and
said complete virtual boot data specifies said source and target world-wide names, a logical unit number, and a file name for an operating system image.

16. A resource manager as recited in claim 15 wherein said connectors include slots for computer blades.

17. A resource manager as recited in claim 15 wherein said controller provides for receiving incomplete virtual boot data from an administration station.

* * * * *

UNITED STATES PATENT AND TRADEMARK OFFICE
CERTIFICATE OF CORRECTION

PATENT NO. : 8,555,048 B2  
APPLICATION NO. : 12/238092  
DATED : October 8, 2013  
INVENTOR(S) : Martin Goldstein et al.

Page 1 of 1

It is certified that error appears in the above-identified patent and that said Letters Patent is hereby corrected as shown below:

In the Specification

In column 6, lines 25-26, delete "f-resource" and insert -- resource --, therefor.

Signed and Sealed this
Twenty-seventh Day of May, 2014

Michelle K. Lee
*Deputy Director of the United States Patent and Trademark Office*